Feb. 27, 1973 — R. J. CERONE — 3,718,310
COMPACT MULTICAVITY WIPER BULLET MOLD
Filed Jan. 21, 1971 — 2 Sheets-Sheet 1

ROBERT J. CERONE
INVENTOR.

BY
Edward R. Weingram
Atty.

Feb. 27, 1973   R. J. CERONE   3,718,310
COMPACT MULTICAVITY WIPER BULLET MOLD
Filed Jan. 21, 1971   2 Sheets-Sheet 2

ROBERT J. CERONE
INVENTOR.

BY
Edward R. Weingram
atty.

United States Patent Office 3,718,310
Patented Feb. 27, 1973

3,718,310
COMPACT MULTICAVITY WIPER BULLET MOLD
Robert J. Cerone, 397 Victor St.,
Saddle Brook, N.J. 07662
Filed Jan. 21, 1971, Ser. No. 108,266
Int. Cl. B41b 11/62
U.S. Cl. 249—165                  9 Claims

ABSTRACT OF THE DISCLOSURE

A bullet mold having complementary sections which form mold cavities on opposite sides of the mold assembly. Wiper plates are associated with the mold cavities on each side of the assembly. The complementary mold sections are adapted to be mounted on handles or other support means for rapid assembly and disassembly of the mold components, and aligning pins insure accurate positions of the mold sections to produce a finished mold product which conforms to predetermined dimensional requirements.

BACKGROUND OF THE INVENTION

Field of the invention

This invention relates to molding apparatus in general and, more particularly, to apparatus for molding bullets and shot balls and the like.

Description of the prior art

Many sportsmen traditionally manufacture much of the firearm ammunition they require for hunting, target shooting, etc. These sportsmen usually produce their own ammunition with relatively small manufacturing systems, which include apparatus for molding the bullets or other projectiles used in the ammunition.

It is extremely important that the molding apparatus be precise enough to produce a well-balanced and properly shaped projectile with a smooth surface finish. Because of the high velocity at which bullets and other firearm projectiles travel, any imbalance in the weight of the projectile, or surface irregularity in the projectile, will cause the projectile to be diverted from its intended path.

Unfortunately, much of the molding equipment which has been available to the sportsman has been less than satisfactory. For example, many molds are relatively complex to operate, are unnecessarily large, unnecessarily expensive, or could not produce a large enough quantity of molded products per unit time to justify their use. Additionally, the molds were often constructed with either extremely complex or ineffective means for aligning the components of the mold assembly, so that the mold product required additional finishing operations before it became suitable for use.

SUMMARY OF THE INVENTION

To overcome the problems set forth by the molding apparatuses available to date, the present invention sets forth a compact mold assembly for fabricating bullets, shot balls, etc., which comprises two complementary molding sections which form mold cavities on opposite sides of the assembly, and which assembly includes wiper plates associated with each set of mold cavities. The components of the mold assembly are adapted to be mounted on any convenient support means for rapid assembly and disassembly and ease of operation. Aligning pins for the complementary mold sections align the mold components to insure a dimensionally accurate finished product which requires little or no additional finishing steps. Expansion grooves on abutting complementary surfaces of the mold components provide passages for gases to escape from the mold cavities, thereby assuring that the finished products are uniform in density.

Accordingly, in view of the above, it is an object of the present invention to provide a mold assembly which has mold cavities formed on opposite sides of the assembly to provide for relatively high production capacity from the mold.

It is another object of the present invention to provide a mold assembly which provides numerous mold cavities which can be used to provide different shapes and sizes of molded products.

Still another object of the present invention is to provide a mold assembly of compact and simplified construction.

A further object of the present invention is to provide a mold assembly which has a simplified wiper plate construction and operation.

It is yet another object of the present invention to provide a mold assembly of compact construction, with wiper plates on different surfaces of the mold assembly.

Still another object of the present invention is to provide a mold assembly which has passages to allow gas to escape from the mold cavities.

Yet another object of the present invention is to provide a mold assembly wherein the mold components are easily assembled and disassembled for rapid and easy operation of the mold.

It is a further object of the present invention to provide a mold assembly having alignment means which accurately and effectively position the components of the assembly to insure the accurate dimensional tolerances for the molded products.

Still another object of the present invention is to provide a mold assembly adapted to be mounted on a wide variety of simple support means.

Other objects and advantages will be apparent from the following description of several embodiments of the invention and the novel features will be particularly pointed out hereinafter in connection with the appended claims.

DESCRIPTION OF THE PREFERRED EMBODIMENT

Figure 1:
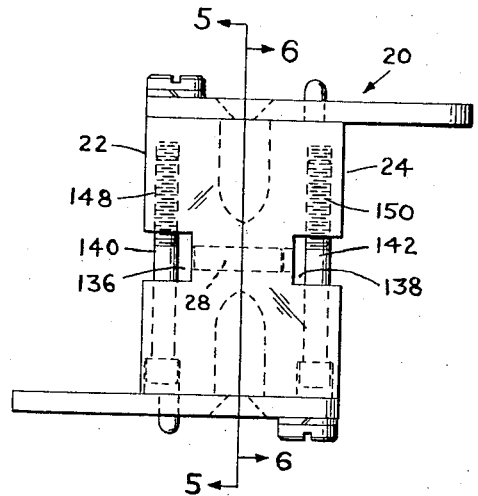
FIG. 1 is a front elevation of an embodiment of a bullet mold assembly built in accordance with the teachings of the present invention.

FIGS. 1 through 8 show a bullet mold assembly, generally indicated at 20, having complementary mold sections 22 and 24 connected by means of aligning pins 26 and 28 extending through holes 30 and 32 in mold section 22 to engage holes 34 and 36 in mold section 24. Righthand mold seciton 24 has a plurality of upper depressions 38 and 40 which are adapted to engage with the plurality of complementary depressions 42 and 44 in lefthand mold section 22 to form upper mold cavities 46 and 48. Similarly, depressions 50 and 52 in mold section 24, and depressions 54 and 56 in mold section 22 coact to form two lower mold cavities in the lower section of the mold assembly.

The complementary mold sections 22 and 24 form a set of mold cavities 46 and 48 in the upper portion of the mold assembly and a set of mold cavities (not shown) in the lower portion of the mold assembly by aligning the mold surfaces or depressions 38, 40, 50 and 52 in the righthand molding section with the complementary molding surfaces or depressions 42, 44, 54 and 56 in the lefthand mold section. The abutting surfaces 58 and 60 of righthand mold section 24 and lefthand mold section 22 respectively are each provided with a series of expansion grooves which communicate the mold depressions with the outer surface of the molding section, which are indicated as 62 on righthand mold section and 64 on lefthand mold section. These grooves are aligned when the mold sections are engaged, and provide passages by which gases in the molding cavities can escape when mold material is poured into the mold cavities.

Each of the mold sections has a wiper plate mounted on the top of the molding section, whcih wiper plate acts to cut off the excess molding material extending from the mold cavities, as will now be described.

Figures 2, 4:
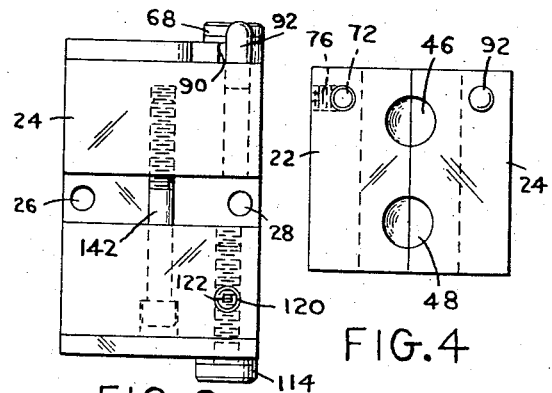
FIG. 2 is a side elevation of FIG. 1.
FIG. 4 is a top view of the bullet mold shown in FIG. 1, with the wiper plates removed.
Figure 3:
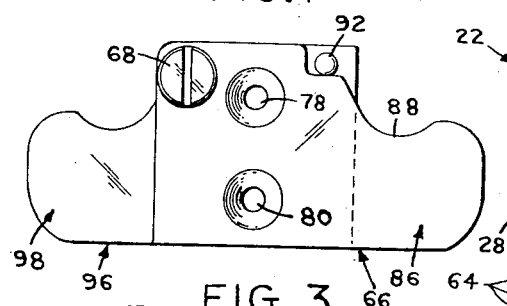
FIG. 3 is a top view of FIG. 1.
Figures 5, 6:
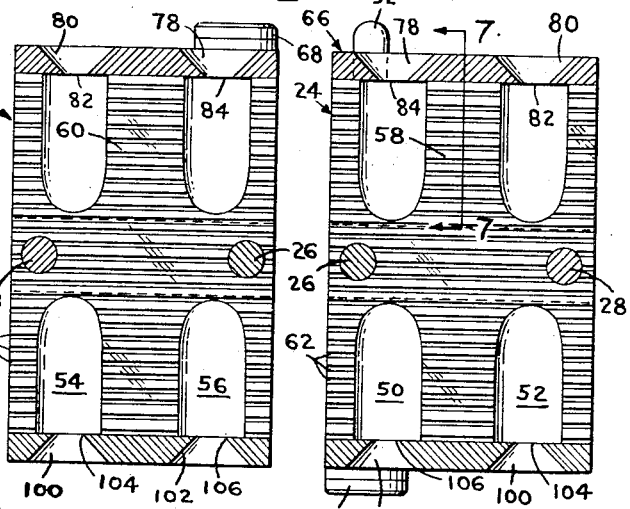
FIG. 5 is a view taken along lines 5—5 of FIG. 1.
FIG. 6 is a view taken along lines 6—6 of FIG. 1.
Figure 8:
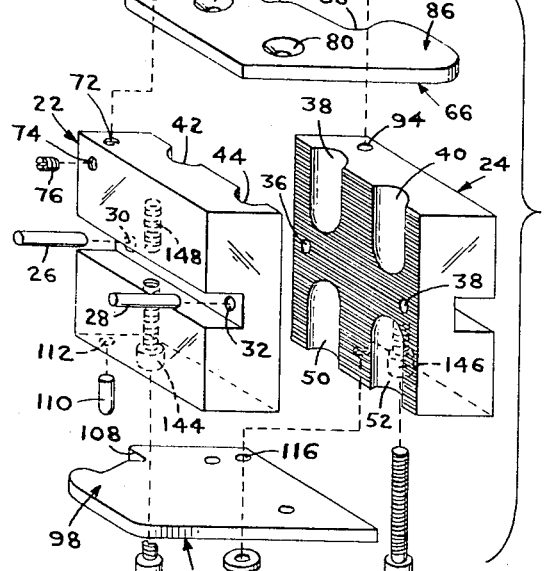
FIG. 8 is an exploded view of the bullet mold assembly shown in FIG. 1.
Figure 7:
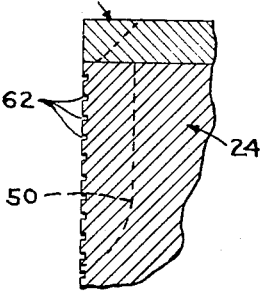
FIG. 7 is a partial view, in section, taken along lines 7—7 of FIG. 6.

As shown in FIG. 8, wiper plate 66 is connected to lefthand molding section 22 by means of a bolt 68 extending through a bolt hole 70 in wiper plate 66 and threadably engaging threaded passage 72 in the upper portion of the molding section. As seen in FIGS. 4 and 8, a set screw passage 74 is machined to intersect threaded passage 72 for the mounting bolt 68, so that a set screw 76 can be used to effectively secure mounting bolt 68 and prevent it from loosening. Wiper plate 66 includes two large passages 78 and 80 which are positioned on the wiper plate to register with the mold cavities 46 and 48 when the wiper plate is in the closed position, as shown in FIG. 3. Passages 78 and 80 of wiper plate 66 are tapered, as shown in FIGS. 5 and 6, to provide shearing edges 82 and 84 respectively, formed by the intersection of the tapered passage and the flat bottom of the wiper plate.

The wiper plate includes a handle section 86 having a curved portion 88 which extends beyond the mold sections and is adapted to be gripped by a finger and swiveled about the connecting bolt 68. A stop shoulder 90 is formed in the wiper plate to coact with a pin 92 which projects from a pin receptacle hole 94 in the mold section adjacent to the section on which the wiper plate is mounted.

In similar manner, the lower wiper plate 96 connected to the righthand mold section 24 includes a handle section 98, two mold material passageways 100 and 102, with sharing surfaces 104 and106 respectively, a pin shoulder 108 which coacts with pin 110 extending from passage 112 and is held in place on righthand mold section 24 by means of a bolt 114 and passes through a passage 116 in the wiper plate to engage a threaded passage 118 in the righthand mold section, which passageway has a perpendicular threaded passage 120 intersecting it for placement of a set screw 122.

Figure 13:
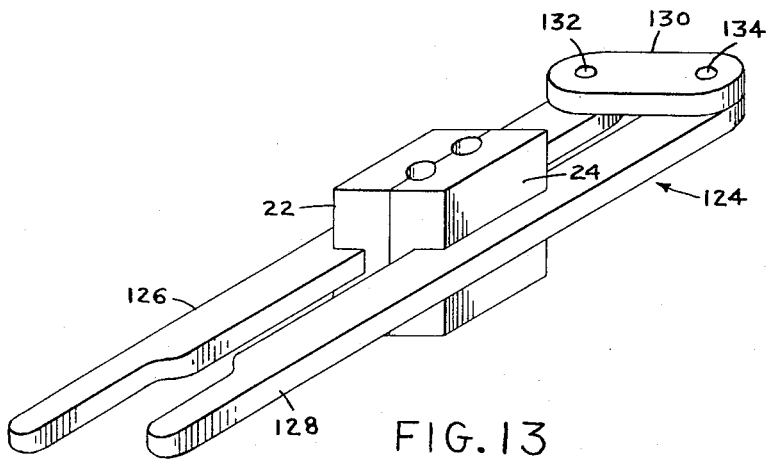
FIG. 13 is a perspective view of a bullet mold assembly built in accordance with the teachings of the present invention, mounted on a convenient support means.

As seen in FIGS. 1 and 13, the mold assembly is adapted to be installed on a support means; for example, a handle assembly 124, shown in FIG. 13. Handles 126 and 128 are connected to a cross member 130 by means of pivot pins 132 and 134, so that the handles can be rapidly opened or brought together. Lefthand and righthand mold sections 22 and 24 have grooves 136 and 138 respectively on the outer surface thereof which are adapted to engage with the coating handles 126 and 128 respectively of the support device. Bolts 140 and 142 passing through countersunk passages 144 and 146 in the lefthand and righthand mold sections 22 and 24 respectively, threadably engage passages 148 and 150 in the portion of the mold section on the other side of the support mounting groove to securely attach the coacting arms of the support device to the mold sections.

OPERATION OF THE DEVICE

For operation, the handles 126 and 128 of support device 124, shown in FIG. 13, are brought to the closed position, so that the engaging pins 26 and 28 of the mold assembly rapidly align the complementary mold sections 22 and 24 to form precise mold cavities. Upper and lower wiper plates 66 and 96 are then placed in the closed position against pins 92 and 110 respectively. Molten molding material is then poured through pouring passages 78 and 80 in upper wiper plate 66 to fill mold cavities 46 and 48 of the mold. As soon as the mold material sets, the mold can be inverted, and the molten mold material poured through pouring passages 100 and 102 on lower wiper plate 96 to fill the lower mold cavities.

As the molten mold material is poured into each of the mold cavities, gases which are present in the mold cavity and which cannot escape through the top of the mold cavity because of the presence of the molding material, escape from the mold cavity through the expansion passages formed by the corresponding expansion grooves 62 and 64. After the mold material has hardened, but not necessarily cooled, wiper plates 66 and 96 are pivoted about bolts 68 and 114 so that the shearing edges 82 and 84 of wiper plate 66 and shearing edges 104 and 106 of wiper plate 96 will cut off the sprue from each cast object extending into the pouring passage, thereby leaving a complete and finished end surface for each molded object. The arms of the support device are then drawn apart to disassemble the mold and allow easy removal of the molded objects, and the mold is now ready for another production cycle.

ANOTHER EMBODIMENT OF THE INVENTION

The embodiment of the invention shown in FIGS. 9, 10, 11 and 12 is similar to that shown in FIGS. 1 through 8. For purposes of simplicity, similar items in FIGS. 9 through 12 will be designated by the same numbers that are used in FIGS. 1 through 8.

Figure 9:
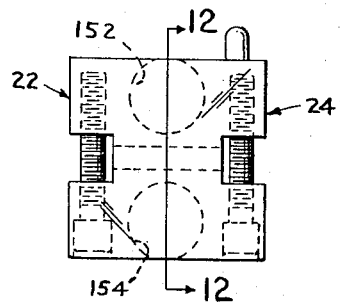
FIG. 9 is a front view of another embodiment of a bullet mold assembly, built in accordance with the teachings of the present invention, with the wiper plates removed.
Figure 10:
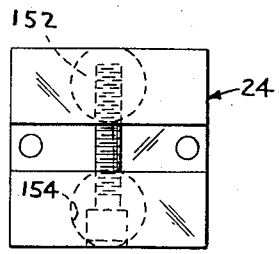
FIG. 10 is a side elevation of the embodiment of the invention shown in FIG. 9.
Figure 11:
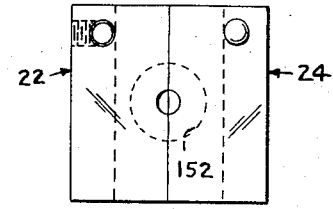
FIG. 11 is a top view of the embodiment shown in FIG. 9.
Figure 12:
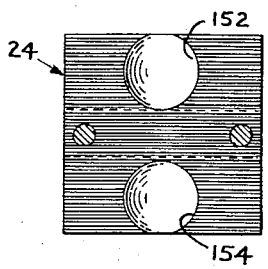
FIG. 12 is a view taken along lines 12—12 of FIG. 9.

The only distinction between the two embodiments is in the shape and number of mold cavities which are formed by the mold assembly. As shown in FIGS. 9 thorugh 12, two spherical mold cavities are formed by the mold assembly, an upper spherical cavity 152 and a lower spherical cavity 154. The action of the wiper plates will be the same as that previously mentioned and operation of the device is also the same. Therefore, the shearing edge of the wiper plate will remove any excess molding material extending above that outer surface of the mold assembly to which the mold cavity communicates.

It should be pointed out that the mold assembly need not be limited to merely two spherical cavities or four standard shaped bullet size cavities, but can have any number of cavities on either the upper or lower surface, or both.

It should also be pointed out that not all of the cavities need be uniform in dimension. For example, the lower mold cavities could be spherical in shape to produce round projectiles, while the upper mold cavities could be the more standard bullet shape.

Additionailly, different sized bullets can be manufactured from a single mold assembly by shaping the various mold cavities to different sizes. So, for example, for the embodiment shown in FIG. 1, variation of the mold cavity size could produce .22 caliber, .38 caliber and .44 caliber bullets.

It should also be pointed out that mold itself is an extremely compact and simple assembly and can be operated with a great deal of ease of relatively unskilled persons.

Additionally, it should be pointed out that although the above-identified description of the embodiments of the invention is related to a bullet mold assembly, the invention is by no means limited to this type of production, but can be used to produce many other types of molded articles.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. A mold assembly having at least two outer surfaces, comprising:
    a first mold section;
    a second mold section adapted to coact with said first mold section to form at least two mold cavities, communicating with different surfaces of said mold assembly;
    first wiper plate means operatively associated with said first mold section to coact with said mold cavity communicated with one outer surface of said mold assembly;
    second wiper plate means operatively associated with said second mold section to coact with said mold cavity communicated with a second outer surface of said mold assembly;
    aligning means coacting with said first and second mold sections to provide proper relative positioning of said mold sections to form said mold cavities upon assembly and disassembly of said mold sections;
    first threaded passage means in said first and second mold sections;
    passage means in said first and second wiper plate means; and
    wiper plate fastening means passing through said passage means in said first and second wiper plate means to engage said first threaded passage means in said first and second mold sections, to fasten said first and second wiper plate means pivotally about said fastening means.

2. The mold assembly claimed in claim 1 comprising means fastening said wiper fastening means in said mold section, including:
    second threaded passage means in said first and second mold sections intersecting said first threaded passage means; and
    set screw means threadably engaged in said second threaded passage means to fix said wiper fastening means in said first threaded passage means.

3. The mold assembly claimed in claim 1, further comprising positioning means for said wiper plate means, including:
    first stop pin means extending from said second mold section;
    a positioning surface on said first wiper plate means adapted to coact with said first stop pin means to position said wiper plate with relation to the mold cavity communicated with one outer surface of said mold assembly;
    second stop pin means extending from said first mold section; and
    a positioning surface on said second wiper plate means adapted to coact with said second stop pin means to position said wiper plate means with relation to the mold cavity communicated with a second outer surface of said mold assembly.

4. The mold assembly claimed in claim 3 wherein:
    said first and second outer surfaces of said mold assembly formed by said first and second coacting mold sections are substantially flat;
and further comprising:
    shearing surfaces in said wiper plate means, comprising:
        a flat bottom surface in each of said wiper plate means; and
        at least one tapered passage in each of said wiper plate means, the intersection of said tapered passage and the bottom of said wiper plate forming a shearing edge adapted to remove excess mold material from said mold cavities upon pivoting of said wiper fastening means about said pivoting means.

5. The mold assembly claimed in claim 1, wehrein:
    said first mold section and said second mold section have mutually abutting surfaces to form said mold cavities; and
    a plurality of expansion grooves on said abutting surfaces of at least one of said mold sections to form a passage means communicating said mold cavities with an outer surface of said mold assembly to provide a pathway for gases to escape frmo said mold cavities.

6. The mold assembly claimed in claim 5 wherein said expansion grooves on said first abutting surface and said second abutting surface are in registration to form a plurality of passages from said mold cavity to said outer surface of said mold assembly.

7. The mold assembly claimed in claim 1 wherein said aligning means comprises:
    at least two aligning pin receptacles in said first mold section;
    at least two aligning pin receptacles in said second mold section; and
    aligning pins extending from the pin receptacles of one mold section to engage the pin receptacles of the other mold section to properly align said mold sections in assembled position.

8. The mold assembly claimed in claim 1, further comprising means to mount said mold assembly on support means, comprising:
    a mounting groove in an outer surface of said first mold section adapted to receive a support member;
    a mounting groove in an outer surface of said second mold section adapted to receive a support member; and
    fastening means associated with said first and second mounting grooves adapted to fasten said first and second mold sections to support members.

9. The mold assembly claimed in claim 8, said fastening means adapted to connect said first and second mold sections to support members, comprising:
    a bolt passage extending from an outer surface of said first and second mold sections to said grooves in said first and second mold sections; and
    threaded passage means in said first and second mold sections coaxially disposed with said bolt passages in said first and second mold sections and communicating with said mounting groove means in said first and second mold sections.

References Cited

UNITED STATES PATENTS

| | | | |
|---|---|---|---|
| 904,273 | 11/1908 | Mundt | 249—161 X |
| 1,083,841 | 1/1914 | Le Blanc | 249—171 X |

(References on following page)

| | | | | | | | |
|---|---|---|---|---|---|---|---|
| 1,000,470 | 8/1911 | Widmann | 249—167 X | 1,431,164 | 10/1922 | Kukac | 249—170 |
| 1,207,852 | 12/1916 | Burger | 249—166 X | 2,114,015 | 4/1938 | Cramer | 164—264 |
| 1,763,977 | 6/1930 | McNeely | 249—161 X | | | | |
| 170,975 | 12/1875 | Wetmore | 249—102 X | | | | |
| 1,493,911 | 5/1924 | Washburn | 249—170 | | | | |
| 705,146 | 7/1902 | Richter | 249—170 | | | | |
| 936,475 | 10/1909 | Putney | 249—161 X | | | | |

J. SPENCER OVERHOLSER, Primary Examiner

J. S. BROWN, Assistant Examiner

U.S. Cl. X.R.

164—264